US011865738B2

(12) United States Patent
Lessard et al.

(10) Patent No.: US 11,865,738 B2
(45) Date of Patent: Jan. 9, 2024

(54) METHOD AND APPARATUS FOR CREATING A PREFERENTIAL BREAKAGE PLANE WITHIN CURED COLUMNS

(71) Applicants: Adam Lessard, Pomfret, CT (US); Kenneth T. Kniss, Annapolis, MD (US); Matthew D. Hammett, Maryville, TN (US); David P. C. Mazzei, Boston, MA (US); Dean A. Elliot, Tampa, FL (US)

(72) Inventors: Adam Lessard, Pomfret, CT (US); Kenneth T. Kniss, Annapolis, MD (US); Matthew D. Hammett, Maryville, TN (US); David P. C. Mazzei, Boston, MA (US); Dean A. Elliot, Tampa, FL (US)

(73) Assignee: Keller North America, Inc., Hanover, MD (US)

( * ) Notice: Subject to any disclaimer, the term of this patent is extended or adjusted under 35 U.S.C. 154(b) by 454 days.

(21) Appl. No.: 17/063,162

(22) Filed: Oct. 5, 2020

(65) Prior Publication Data

US 2021/0101312 A1 Apr. 8, 2021

Related U.S. Application Data

(60) Provisional application No. 62/910,941, filed on Oct. 4, 2019.

(51) Int. Cl.

| | |
|---|---|
| ***E21B 10/44*** | (2006.01) |
| ***B28D 1/24*** | (2006.01) |
| ***E04C 3/34*** | (2006.01) |
| ***B28D 1/22*** | (2006.01) |
| ***E02D 5/80*** | (2006.01) |
| ***E21B 11/00*** | (2006.01) |

(52) U.S. Cl.
CPC ............... *B28D 1/24* (2013.01); *B28D 1/228* (2013.01); *E02D 5/801* (2013.01); *E04C 3/34* (2013.01); *E21B 11/005* (2013.01)

(58) Field of Classification Search
CPC ........ E21B 11/005; E21B 10/44; E21B 7/008; E02D 5/801; E02D 9/005; B28D 1/24; B28D 1/228; B28D 1/227; E04C 3/34
See application file for complete search history.

(56) References Cited

U.S. PATENT DOCUMENTS 357,544 A * 2/1887 Albright
2,766,014 A * 10/1956 Hanson .................. F25C 5/043 175/413

(Continued)

*Primary Examiner* — Brian E Glessner
*Assistant Examiner* — Daniel J Kenny
(74) *Attorney, Agent, or Firm* — Royal W. Craig; Gordon Feinblatt LLC

(57) ABSTRACT

A frangibility device for creating a preferred breakage plane or weakness within cured columns such as rigid inclusions (RIs) and/or vibratory concrete columns (VCCs) comprises a cutting disc, an elongate strut attached to the center of the disc, and a detachable handle for turning. The disc comprises a thin geometric plate slit from center to periphery, so that a slicing wing can be bent downward at a shallow angle from the slit. The slicing wing advances the cutting disc through the cementious material of the uncured column. When the disc reaches the desired depth, the handle is removed and both disc and strut are left in place during curing.

4 Claims, 2 Drawing Sheets

(56) References Cited

U.S. PATENT DOCUMENTS

| | | | | | |
|---|---|---|---|---|---|
| 2,917,826 | A * | 12/1959 | Pohr | A01G 3/062 | |
| | | | | 56/295 | |
| 4,488,605 | A * | 12/1984 | Ruppel | E21B 7/008 | |
| | | | | 175/18 | |
| 4,659,127 | A * | 4/1987 | Hancovsky | A01G 3/06 | |
| | | | | 294/50.7 | |
| D764,243 | S * | 8/2016 | McConnell | D8/8 | |
| 10,257,971 | B2 * | 4/2019 | Kittelson | A01B 33/085 | |
| 2008/0223620 | A1 * | 9/2008 | Chan | E21B 11/005 | |
| | | | | 175/385 | |
| 2014/0174824 | A1 * | 6/2014 | Schamberger | H02K 7/145 | |
| | | | | 175/18 | |
| 2018/0010315 | A1 | 1/2018 | Quesada | | |

* cited by examiner

METHOD AND APPARATUS FOR CREATING A PREFERENTIAL BREAKAGE PLANE WITHIN CURED COLUMNS

CROSS-REFERENCE TO RELATED APPLICATIONS

The present application derives priority from U.S. Provisional Application Ser. No. 62/910,941 filed 4 Oct. 2019.

BACKGROUND OF THE INVENTION

1. Field of the Invention

The present invention relates to ground improvement in general, and more specifically to a method and apparatus for creating a weakness or preferential breakage plane at a desired elevation within cured columns formed from cement and aggregate compounds, e.g. concrete, such as rigid inclusions and/or vibratory concrete columns.

2. Description of the Background

Rigid inclusions (RIs), Controlled Stiffness Columns (CSCs®), Controlled Modulus Columns (CMCs), GeoConcrete® Columns (GCCs), Cast-In-Place Ground Improvement Elements (CGEs), Vibratory Concrete Columns (VCCs), Rigid Column Inclusions (RCIs), Grouted Columns, Settlement Reducing Elements and Grouted Aggregate Piers (APs), Grouted Impact® System are various designations for stiff ground improvement elements comprised of an aggregate/grout/cement paste mixture, cement-treated aggregate, plain concrete or other cured fill material, formed in a column and extending through overburden soils to denser/stiffer soils for the purposes of reducing settlement, increasing bearing capacity, improving slope stability or global stability. The stiff elements commonly work as a system with an engineered granular "footing pad." There are also various tradenames for the foregoing such as Controlled Modulus Column (CMC). The term Rigid Inclusion (RI) is herein defined as any stiff ground improvement element comprised wholly or partially of a curable fill material.

RIs are typically installed through soft/loose to very soft/loose soils (commonly silt, clay, peat or some combination thereof) to transfer loads to more competent load-bearing strata, i.e. stiffer/denser/stronger. Some of the load is transferred to the RIs and some of the load to the surrounding matrix soils. RIs/VCCs can be used to provide an improved subgrade for foundation support without the need for piles, structural grade beams, or structural slabs. RIs can usually be installed by a displacement installation method: an auger is rotated into the ground and displaces the surrounding material with some material coming to the surface. When the auger reaches the desired depth, its direction of rotation is reversed, and cementitious grout is pumped down through it and discharged into the hole. The auger is raised until the RI is of the desired height. RIs may also be constructed using a mandrel to displace the in-situ material. Grout, aggregate and/or concrete is pumped through the mandrel and discharged into the hole.

VCCs are installed using a vibratory installation method. Rather than an auger, a vibroflot penetrates the soil until it reaches a suitable load-bearing stratum. Concrete is discharged at the bottom of the column to form an enlarged bulb, and then discharged continuously to form a column as the vibroflot is withdrawn. As above the vibroflot is raised until the VCC is of the desired height.

In some cases RIs/VCCs are used beneath an overhead structure such as a foundation, slab or embankment, in which case a load transfer platform (LTP) is typically installed just above the RI/VCC to transfer load from the overhead structure to the column. This approach reduces bending moments, shear forces and stress concentrations in the overhead structure. LTPs often consist of 0.5-feet to 5-feet of compacted granular soil and may include layer(s) of embedded geogrid or steel mesh. Use of an LTP necessitates some excavation and the RIs/VCCs typically require "cutting", e.g., shallow flat-top cutoffs (i.e. 1-5' below the working surface). Typically, the RIs/VCCs are trimmed by field personnel using hand tools, but cutoffs over approximately three feet require specialized cutoff equipment to achieve the requisite accuracy and maintain quality/integrity of the column. The step of cutting is generally carried out when the grout/concrete has not reached initial set but can be carried out after hardening. Regardless of timing, the cutoff procedure is imprecise and labor intensive.

United States Patent Application 20180010315 by Quesada suggests a device for precutting a column that uses a foldable membrane that can be deployed into a disc shape. The folded device is pushed down through the uncured concrete column to a precut depth using a pusher, and is there unfolded to its disc-shape by rotation of the pusher. The device 1 is left in position as an obstruction during the hardening of the cement to provide a precut of the column at the desired level due to the weakness that its presence induces during the hardening of the filling material in the column. While this precut concept has merit the mechanics of the Quesada device are fragile and unreliable.

What is needed is a more efficient, scalable, reliable and robust device for insertion into an uncured column that can be left in position during the hardening of the cured fill material to provide a preferential breakage plane or weakness within the cured column at the desired level.

SUMMARY OF THE INVENTION

Accordingly, it is an object of the present invention to provide an improved method for creating a preferred breakage plane or weakness within cured ground improvement elements such as RIs (including VCCs) by screw-insertion of an insert into the uncured column (cement or cement-aggregate compound) and leaving in position during hardening to provide a frangible breakpoint at the desired elevation.

Another object is to provide an improved device as described above that is more efficient, scalable, reliable and robust in carrying out the method.

These and other features and benefits are achieved with an improved frangibility device for creating a preferred breakage plane or weakness within cured columns such as rigid inclusions (RIs) and/or vibratory concrete columns (VCCs). An embodiment comprises a disc and an elongate strut attached to the disc along a defined axis of rotation. A detachable handle has a socket for insertion onto the strut and an orthogonal hand grip for turning and pushing. In one preferred configuration the disc comprises a thin geometric plate symmetric in a plane about an axis of rotation through mass center point P. The disc is slit from a point slightly offset from center to its periphery, and a slicing wing is bent downward at a shallow angle.

The elongate strut may be demarcated with length indicia. In use the handle is attached to the strut and turned by hand while applying downward pressure, rotating the disc. The rotating wing slices helically through the surrounding uncured cementious material and advances the disc through the uncured column. When the disc reaches the desired depth, the handle is removed and both disc and strut are left in place during curing. After curing, the column simply snaps off along a plane immediately below the disc when sufficient force is applied to the column above the disc elevation. The residual column with embedded strut and disc can be easily removed in the course of standard construction prior to LTP installation (if required)

For a more complete understanding of the invention, its objects and advantages, refer to the remaining specification and to the accompanying drawings.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 4 is a perspective view prior to insertion of the frangibility device 2.

FIG. 5 is a perspective view illustrating downward insertion of the frangibility device 2.

FIG. 6 is a perspective view illustrating excavation.

DETAILED DESCRIPTION OF THE PREFERRED EMBODIMENTS

Figure 3:
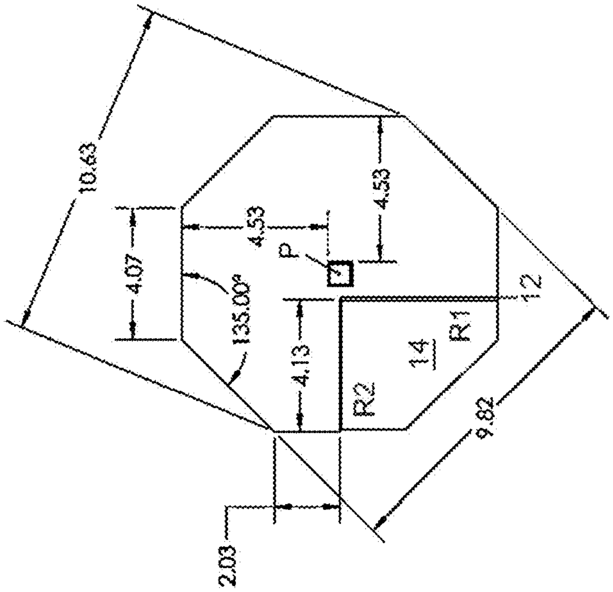
FIG. 3 is a bottom view of the disc 10 of FIGS. 1-2 with exemplary dimensions.
Figure 2:
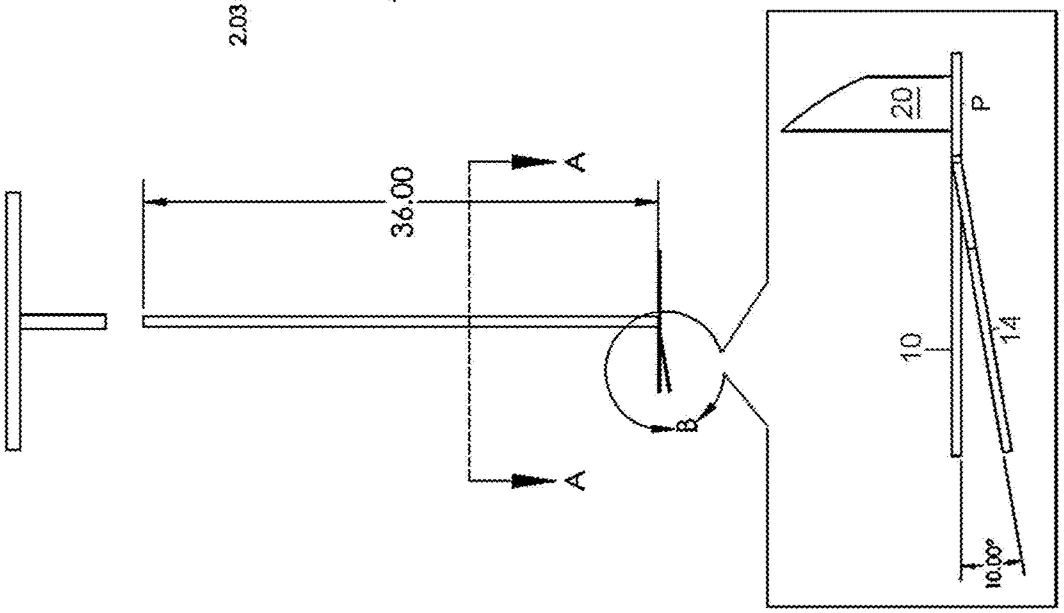
FIG. 2 is a side profile view of the frangibility device 2 of FIG. 1 with enlarged inset of the disc 10.
Figure 1:
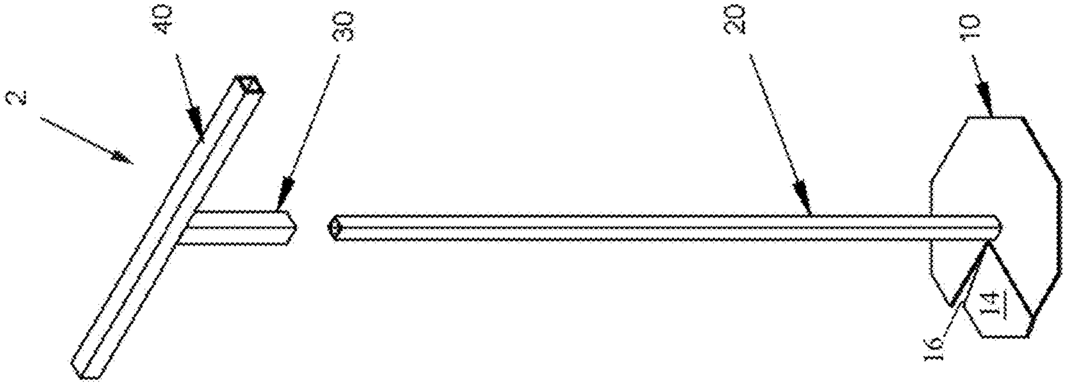
FIG. 1 is a side perspective view of a frangibility device 2 according to the present invention.

The present invention is a frangibility device, simple in construction, with easy to use methods for creating weakness or a preferred breakage plane within cured columns such as rigid inclusions (RIs) and/or vibratory concrete columns (VCCs). As seen in FIGS. 1-3 the frangibility device 2 generally comprises a disc 10 having a mass center point P on an axis of rotation, and a diameter substantially equal to the design diameter of the RIs/VCCs to be precut. An elongate strut 20 extends along the axis of rotation, and a detachable handle comprising a socket 30 for insertion onto the strut 20 and an orthogonal hand grip 40 for turning. As seen in FIG. 2 the disc 10 comprises a thin geometric plate symmetric in a plane about an axis of rotation through mass center point P. The disc 10 may comprise a circular, square or polygonal geometric plate, the illustrated embodiment comprising an octagon. The disc 10 is slit at 12 along a first radius R1 running from a point offset slightly from the mass center point P to its periphery, and a section is bent along a second radius R2 downward to form a depressed wing 14 that inclines progressively downward at an angle from mass center point P along slit 12 toward the periphery. The wing 14 is preferably bent downward at an angle within a range of from 5-25 degrees, and most preferably (as seen in FIG. 2) at approximately a 10 degree angle.

The disc 10 may be formed by cutting a symmetric geometric figure from a sheet of steel, cutting a slit 12 along radius R1 and bending wing 14 downward along radius R2 at the desired angle. The slicing wing 14 presents a leading slicing edge 16, which may optionally be sharpened to slice through the uncured cement. Forming the slit 12 along radius R1 offset slightly (e.g., 16% as shown) from the mass center point P to its periphery makes it possible to complete the bend with distal pressure in a vice or the like. However, one skilled in the art should understand that other embodiments of the disc 10 are possible by other conventional molding or machining methods. For example, disc 10 may comprise a shallow helical plate in the nature of an auger, a circular plate having a radial slot and a downwardly-canted blade in arrears of the slot in the nature of a spiral slicing blade, or any other rotary member capable of advancing itself through and displacing the wet cement/grout upon rotation.

The elongate strut 20 may comprise any elongate member fixedly attached at mass center point P such as by welding to the disc 10 and extending coaxially along the axis of rotation of the disc 10. The elongate strut 20 preferably extends within a range of 30-50 inches, and optimally extends approximately 36 inches as seen in FIG. 2. The elongate strut 20 is keyed to the socket 30, and as illustrated the entire strut 20 may be formed from a square-tubular length of steel, the socket 30 being similarly formed with an interior hollow generally conforming to the exterior of strut 20 so as to slidably receive it. In an embodiment the elongate strut 20 may be demarcated lengthwise with length indicia to visually indicate insertion depth. The hand grip 40 is fixedly attached across an end of socket 30 and preferably extends equilaterally and orthogonally on both sides for turning by hand.

In use, the handle is inserted onto the strut 20 and hand-turned by hand grip 40, manually turning the disc 10 counterclockwise to screw it downward about mass center point P through an uncured concrete or cementious grout column such as an RI and/or VCC. The wing 14 serves to advance the disc 10 through the concrete or grout essentially shaving a volume, expelling it sideward, and advancing helically downward at R1 from mass center point P within a range of from 5-25 degrees, and most preferably (as seen in FIG. 2) at approximately a 10 degree angle.

Figure 6:
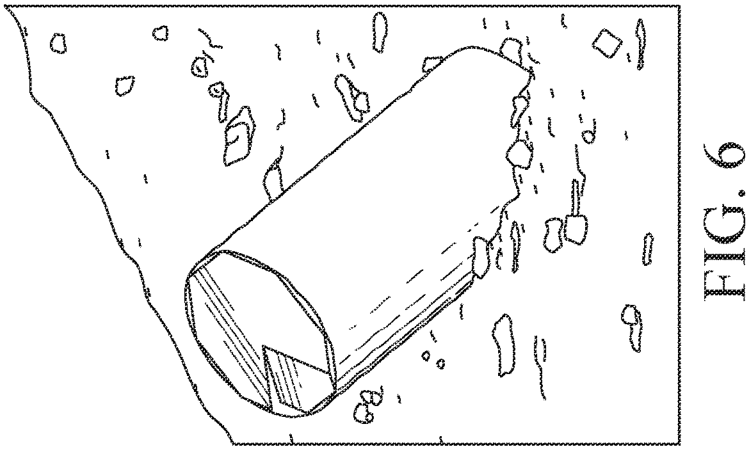
FIGS. 4-6 are sequential views of the frangibility device 2 of FIGS. 1-3 collectively illustrating its method of use.
Figure 5:
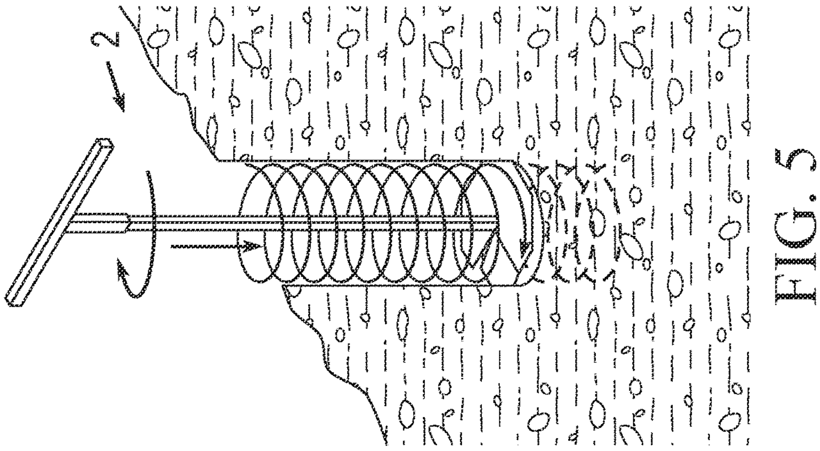
Figure 4:
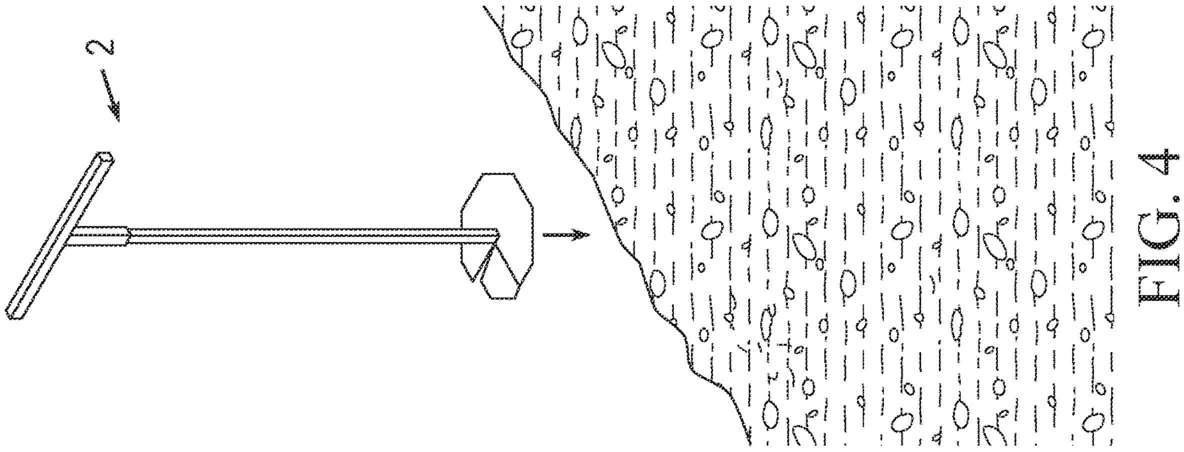

The method of cutting begins with the concrete or cemenetious grout column still in uncured form. As seen at FIG. 4 the frangibility device 2 is assembled and disc 10 is brought to bear atop the column. As seen at FIG. 5 an operator manually turns the frangibility device 2 counterclockwise so that the disc 10 advances vertically downward into the column. The device 2 is advanced to the desired position at a given depth of the column. The depth may be indicated by the measurement indicia on strut 20 until it corresponds to a desired flat top level. Once the desired depth has been reached and checked. The handle including socket 30 and hand grip 40 are removed, as the disk 10 and strut 20 remain in place while the cement solidifies. As shown in FIG. 6, after curing, an operator manipulates an excavator to excavate the ground to the bottom of LTP elevation and in so doing snaps a sacrificial section of the column off. As a result of the strut 20 being embedded, the column breaks along a plane immediately below the disc 10 and an upper section of the column (with strut 20 embedded therein and disc 10 exposed) can be easily removed. The remainder of the column is now flat-top flush with the excavated surface and perfectly in line with the execution tolerances required. If desired, the cement or cementious grout surrounding the strut 20 and disc 10 can be removed One skilled in the art will understand that components of embodiments of this disclosure can be formed from any materials suitable for the purposes of this disclosure and attached or otherwise joined according to any attachment mechanisms suitable for the purposes of this disclosure. In addition, disc 10 (or other-shaped cutting member) can be scaled in size to conform to any design diameter of RIs/VCCs.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A frangibility device for creating a preferred breakage plane within ground improvement elements, comprising:

a cutting member comprising a thin planar geometric plate formed with a single cement slicing wing, the cutting member having a straight radial slit extending along a first radius from a point offset from a geometric center of said cutting member to its periphery, and said planar geometric plate bent downward along a second radius perpendicular to said first radius to form the single cement slicing wing as an inclined sector of said planar geometric plate that is inclined progressively downward and outward along said slit for advancing the cutting member through uncured cementitious material of said ground improvement element;

an elongate strut attached to the center of the cutting member; and a handle removably attachable to the strut for turning the cutting member and screw-advancement and slicing through an uncured column of cementitious material to a desired depth;

whereby, after curing, said column of cementitious material can be easily broken along a plane immediately below the cutting member and an upper section removed with said elongate strut and cutting member.

2. The frangibility device according to claim 1, wherein said cutting member comprises a geometric plate having any of a circular, square or polygonal geometry.

3. The frangibility device according to claim 1, wherein said cutting member comprises a geometric plate having a center of rotation.

4. The frangibility device according to claim 1, wherein said cement slicing wing is canted downward from said member at an angle of approximately 10 degrees.

* * * * *